US010187177B2

(12) United States Patent
Gollakota et al.

(10) Patent No.: US 10,187,177 B2
(45) Date of Patent: Jan. 22, 2019

(54) WIRELESS NETWORKING COMMUNICATION METHODS, SYSTEMS, AND DEVICES OPERABLE USING HARVESTED POWER (71) Applicant: UNIVERSITY OF WASHINGTON, Seattle, WA (US)

(72) Inventors: Shyamnath Gollakota, Seattle, WA (US); Joshua R. Smith, Seattle, WA (US); David Wetherall, Seattle, WA (US); Bryce Kellogg, Seattle, WA (US); Aaron N. Parks, Seattle, WA (US)

(73) Assignee: University of Washington, Seattle, WA (US)

( * ) Notice: Subject to any disclaimer, the term of this patent is extended or adjusted under 35 U.S.C. 154(b) by 154 days.

(21) Appl. No.: 15/118,443

(22) PCT Filed: Feb. 11, 2015

(86) PCT No.: PCT/US2015/015479
§ 371 (c)(1),
(2) Date: Aug. 11, 2016

(87) PCT Pub. No.: WO2015/123341
PCT Pub. Date: Aug. 20, 2015

(65) Prior Publication Data
US 2017/0180075 A1 Jun. 22, 2017

Related U.S. Application Data (60) Provisional application No. 61/938,576, filed on Feb. 11, 2014, provisional application No. 62/028,263, filed on Jul. 23, 2014.

(51) Int. Cl.
*H04B 1/04* (2006.01)
*H04L 1/00* (2006.01)
(Continued)

(52) U.S. Cl.
CPC ............ *H04L 1/0002* (2013.01); *H02J 3/382* (2013.01); *H02J 3/383* (2013.01); *H02J 50/00* (2016.02);
(Continued)

(58) Field of Classification Search
CPC .............................................. H04B 2001/0491
See application file for complete search history.

(56) References Cited

U.S. PATENT DOCUMENTS 4,298,280 A 11/1981 Harney
4,916,460 A 4/1990 Powell
(Continued)

FOREIGN PATENT DOCUMENTS

EP 2976734 1/2016
WO 2014153516 A1 9/2014
(Continued)

OTHER PUBLICATIONS

U.S. Appl. No. 15/752,214 entitled 'Backscatter Devices and Network Systems Incorporating Backscatter Devices' filed Feb. 12, 2018, pp. all.
(Continued)

*Primary Examiner* — Ayanah S George
(74) *Attorney, Agent, or Firm* — Dorsey & Whitney LLP (57) ABSTRACT Example devices described herein include endpoint devices which may communicate with an access point device by modulating a channel associated with the wireless communication to encode transmit data. The channel modulation may be performed by utilizing a switch to control an impedance of an antenna at the endpoint device to either reflect or absorb wireless network communication signals received by the endpoint device. The access point device may extract the transmit data by decoding changes in the channel caused, at least in part, by the modulation. Access
(Continued)

point devices may transmit a pattern of packets—the presence or absence of which may correspond with transmit data. Endpoint devices may decode this data by using an energy detector to differentiate between the presence or absence of a packet.

20 Claims, 5 Drawing Sheets

(51) Int. Cl.
*H02J 50/00* (2016.01)
*H02J 3/38* (2006.01)
*H04W 4/70* (2018.01)
*H04W 84/12* (2009.01)

(52) U.S. Cl.
CPC .............. *H04Q 2213/1308* (2013.01); *H04Q 2213/13298* (2013.01); *H04W 4/70* (2018.02); *H04W 84/12* (2013.01)

(56) References Cited

U.S. PATENT DOCUMENTS

| | | | |
|---|---|---|---|
| 5,220,330 A | 6/1993 | Salvail et al. |
| 5,321,599 A | 6/1994 | Tanamachi et al. |
| 5,649,296 A | 7/1997 | Maclellan et al. |
| 5,663,710 A | 9/1997 | Fasig et al. |
| 5,995,040 A | 11/1999 | Issler et al. |
| 6,084,530 A | 7/2000 | Pidwerbetsky et al. |
| 6,094,450 A | 7/2000 | Shockey |
| 6,243,012 B1 | 6/2001 | Shober et al. |
| 6,297,696 B1 | 10/2001 | Abdollahian et al. |
| 6,611,224 B1 | 8/2003 | Nysen et al. |
| 6,745,008 B1 | 6/2004 | Carrender et al. |
| 6,765,476 B2 | 7/2004 | Steele et al. |
| 6,870,460 B2 | 3/2005 | Turner et al. |
| 6,970,089 B2 | 11/2005 | Carrender |
| 7,180,402 B2 | 2/2007 | Carrender et al. |
| 7,215,976 B2 | 5/2007 | Brideglall |
| 7,358,848 B2 | 4/2008 | Mohamodi |
| 7,469,013 B1 | 12/2008 | Bolt et al. |
| 7,796,016 B2 | 9/2010 | Fukuda |
| 7,839,283 B2 | 11/2010 | Mohamadi et al. |
| 7,961,093 B2 | 6/2011 | Chiao et al. |
| 7,995,685 B2 | 8/2011 | Wang et al. |
| 8,026,839 B2 | 9/2011 | Weber |
| 8,170,485 B2 | 5/2012 | Hulvey |
| 8,284,032 B2 | 10/2012 | Lee et al. |
| 8,391,824 B2 | 3/2013 | Kawaguchi |
| 8,526,349 B2 | 9/2013 | Fischer |
| 8,797,146 B2 | 8/2014 | Cook et al. |
| 8,971,704 B2 | 3/2015 | Cavaliere et al. |
| 9,312,950 B1 | 4/2016 | Deyle |
| 9,357,341 B2 | 5/2016 | Deyle |
| 9,680,520 B2 | 6/2017 | Gollakota et al. |
| 9,973,367 B2 | 5/2018 | Gollakota et al. |
| 2002/0015436 A1 | 2/2002 | Ovard et al. |
| 2003/0043949 A1 | 3/2003 | O'Toole et al. |
| 2003/0133495 A1 | 7/2003 | Lerner et al. |
| 2003/0174672 A1 | 9/2003 | Herrmann |
| 2004/0005863 A1 | 1/2004 | Carrender |
| 2004/0210611 A1 | 10/2004 | Gradishar et al. |
| 2005/0053024 A1 | 3/2005 | Friedrich |
| 2005/0099269 A1 | 5/2005 | Diorio et al. |
| 2005/0201450 A1 | 9/2005 | Volpi et al. |
| 2005/0265300 A1 | 12/2005 | Rensburg |
| 2006/0044147 A1* | 3/2006 | Knox ................ G01S 3/32 340/686.1 |
| 2006/0045219 A1 | 3/2006 | Wang et al. |
| 2006/0082458 A1 | 4/2006 | Shanks et al. |
| 2006/0087406 A1 | 4/2006 | Willins et al. |
| 2006/0220794 A1 | 10/2006 | Zhu |
| 2006/0236203 A1 | 10/2006 | Diorio et al. |
| 2006/0261952 A1 | 11/2006 | Kavounas et al. |
| 2007/0018904 A1 | 1/2007 | Smith |
| 2007/0046434 A1 | 3/2007 | Chakraborty |
| 2007/0069864 A1 | 3/2007 | Bae et al. |
| 2007/0096876 A1 | 5/2007 | Bridgelall et al. |
| 2007/0109121 A1 | 5/2007 | Cohen |
| 2007/0111676 A1 | 5/2007 | Trachewsky et al. |
| 2007/0115950 A1 | 5/2007 | Karaoguz et al. |
| 2007/0201786 A1 | 8/2007 | Wuilpart |
| 2007/0210923 A1 | 9/2007 | Butler et al. |
| 2007/0285245 A1 | 12/2007 | Djuric et al. |
| 2007/0293163 A1 | 12/2007 | Kilpatrick |
| 2008/0131133 A1 | 6/2008 | Blunt et al. |
| 2008/0136646 A1 | 6/2008 | Friedrich |
| 2008/0165007 A1 | 7/2008 | Drago et al. |
| 2008/0207357 A1 | 8/2008 | Savarese et al. |
| 2008/0211636 A1 | 9/2008 | O'Toole et al. |
| 2008/0225932 A1 | 9/2008 | Fukuda |
| 2008/0252442 A1 | 10/2008 | Mohamadi et al. |
| 2009/0201134 A1 | 8/2009 | Rofougaran |
| 2009/0243804 A1 | 10/2009 | Fukuda |
| 2010/0156651 A1 | 6/2010 | Broer |
| 2010/0271188 A1 | 10/2010 | Nysen |
| 2011/0053178 A1 | 3/2011 | Yang |
| 2012/0001732 A1 | 1/2012 | Kawaguchi |
| 2012/0002766 A1 | 1/2012 | Kawaguchi |
| 2012/0051411 A1 | 3/2012 | Duron et al. |
| 2012/0112885 A1 | 5/2012 | Drucker |
| 2012/0245444 A1 | 9/2012 | Otis et al. |
| 2012/0311072 A1 | 12/2012 | Huang et al. |
| 2012/0313698 A1 | 12/2012 | Ochoa et al. |
| 2013/0028305 A1 | 1/2013 | Gollakota et al. |
| 2013/0028598 A1 | 1/2013 | Cavaliere et al. |
| 2013/0069767 A1 | 3/2013 | Ovard et al. |
| 2013/0176115 A1 | 7/2013 | Puleston et al. |
| 2013/0215979 A1 | 8/2013 | Yakovlev et al. |
| 2013/0223270 A1* | 8/2013 | Cheng ................ H04W 24/04 370/252 |
| 2013/0265140 A1* | 10/2013 | Gudan ............... G06K 7/10207 340/10.3 |
| 2013/0286959 A1 | 10/2013 | Lou et al. |
| 2013/0322498 A1 | 12/2013 | Maquire |
| 2014/0044233 A1 | 2/2014 | Morton |
| 2014/0113561 A1 | 4/2014 | Maguire |
| 2014/0364733 A1 | 12/2014 | Huang et al. |
| 2015/0311944 A1 | 10/2015 | Gollakota et al. |
| 2015/0381269 A1 | 12/2015 | Deyle |
| 2016/0365890 A1 | 12/2016 | Reynolds et al. |
| 2017/0180178 A1 | 6/2017 | Gollakota et al. |
| 2017/0180703 A1 | 6/2017 | Kovacovsky et al. |
| 2017/0331509 A1 | 11/2017 | Gollakota et al. |

FOREIGN PATENT DOCUMENTS

| | | |
|---|---|---|
| WO | 2015123306 A1 | 8/2015 |
| WO | 2016100887 A2 | 6/2016 |
| WO | 2017027847 A1 | 2/2017 |
| WO | 2017132400 A1 | 8/2017 |
| WO | 2017176772 A1 | 10/2017 |
| WO | 2018075653 A1 | 4/2018 |

OTHER PUBLICATIONS

International Search Report and Written Opinion dated Jul. 6, 2015 received for PCT/US2015/015479.
Advanced Television Systems Committee (ATSC) (Sep. 1995) "ATSC Digital Television Standard,"ATSC Doc. A/53, 74 pages, Sep. 1995.
Analog Devices (retrieved Apr. 2016) "ADG919 RF Switch Datasheet," available online at: http://www.datasheet-pdf.com/PDF/ADG919-Datasheet-AnalogDevices-140819, Apr. 2016.
Analog Devies, Inc. (retrieved Jan. 2016) "ADG902 RF switch datasheet,"available online at: http://www.analog.com/static/imported-filed/data_sheets/adg901_902.pdf, Jan. 2016.
Axcera.com (retrieved Jan. 2016) "8VSB vs. COFDM," available online at: http://www.axcera.com/downloads/technotes-whitepapers/technote_4.pdf, Jan. 2016.

(56) References Cited

OTHER PUBLICATIONS

DiBEG (May 2014; retrieved Jan. 2016) "The Launching Country," available online at: http://www.dibeg.org/world/world.html, May 2014.
E. Inc. (retrieved Apr. 2016) "Universal software radio peripheral," available online at: http://ettus.com, Apr. 2016.
Encounternet (retrieved Jan. 2016) "The Encounternet Project," available online at: http://encounternet.net/, Jan. 2016.
Federal Communications Commission (retrieved Jan. 2016) "41 dBu service contours around ASRN 1226015, FCC TV query database," available online at: http://transition.fcc.gov/fcc-bin/tvq?list=0&facid=69571, Jan. 2016.
STMicroelectronics (Jul. 2012) "TS 881 Datasheet," 1 page, Jul. 2012.
Anthony,Sebastian, "Free energy harvesting from TV signals, to power a ubiquitous internet of things", ExtremeTech, google search, 8 pages, Jul. 8, 2013.
Bharadia, et al.,"Full duplex backscatter", Proceedings of the 12th ACM Workshop on Hot Topics in Networks, Article No. 4, pp. 1-7, Nov. 2013.
Bharadia, et al., ""Full duplex radios"", Proceedings of the ACM SIGCOMM 2013 (SIGCOMM '13), pp. 375-386, Aug. 2013.
Bohorquez, et al., "A 350µW CMOS MSK transmitter and 400µW OOK super-regenerative receiver for medical implant communications", IEEE Journal of Solid-State Circuits, 44(4):1248-1259, Apr. 2009.
Buettner, "Backscatter Protocols and Energy-Efficient Computing for RF-Powered Devices", PhD Thesis, University of Washington, Seattle, WA, 144 pages, 2012, Retrieved Jan. 2016.
Buettner, et al., "Dewdrop: An energy-aware runtime for computational RFID", Proceedings of the 8th USENIX Conference on Networked Systems Design and Implementation (NSDI'11), pp. 197-210, Mar. 2011.
Buettner, et al,, "RFID Sensor Networks with the Intel WISP", Proceedings of the 6th ACM Conference on Embedded Network Sensor Systems (SenSys '08), pp. 393-394, Nov. 2008.
Dayhoff, "New Policies for Part 15 Devices", Federal Communications Commission (FCC) Telecommunications Certification Body Council (TCBC) Workshop 2005, 13 pages, May 2005.
Dementyev, et al., "Wirelessly Powered Bistable Display Tags", ACM International Joint Conference on Pervasive and Ubiquitous Computing (UbiComp '13), pp. 383-386, Sep. 2013.
Dementyev, A. et al., "A Wearable UHF RFID-Based EEG System", 2013 IEEE International Conference on RFID (RFID), pp. 1-7, Apr.-May 2013.
Duarte, et al., "Full-duplex wireless communications using off-the-shelf radios: Feasibility and first results", 2010 Conference Record of the 44th Asilomar Conference on Signals, Systems and Computers (ASILOMAR), pp. 1558-1562, Nov. 2010.
Duarte, "Full-duplex Wireless: Design, Implementation and Characterization", Ph. D. thesis, Rice University, 70 pages, Apr. 2012.
Duc, et al., "Enhancing Security of EPCGlobal Gen-2 RFID against Traceability and Cloning", Auto-ID Labs Information and Communication University, Auto-ID Labs White Paper No. WP-SWNET-016, 11 pages, 2006, Retrieved Jan. 2016.
Elliott, "Average U.S. Home Now Receives a Record 118.6 TV Channels, According to Nielsen", available online at: http://www.nielsen.com/us/en/insights/pressroom/2008/average_u_s_home.html, Jun. 2008.
Gorlatova, et al., "Energy harvesting active networked tags (EnHANTs) for ubiquitous object networking", IEEE Wireless Communications, 17(6):18-25, Dec. 2010.
Guo, et al., "Virtual full-duplex wireless communication via rapid on-off-division duplex", 48th Annual Allerton Conference on Communication, Control, and Computing (Allerton), pp. 412-419, Sep.-Oct. 2010.
Jain, et al., "Practical, real-time, full duplex wireless", Proceedings of the 17th Annual International Conference on Mobile Computing and Networking (MobiCom '11), pp. 301-312, Sep. 2011.
Johnston, Scott, "Software Defined Radio Hardware Survey", Oct. 2011, 31 pgs.
Kellogg, et al.,"Bringing gesture recognition to all devices", Proceedings of the 11th USENIX Conference on Network Systems Design and Implementation (NSDI'14), pp. 303-316, Apr. 2014.
Kim, et al., "Flush: a reliable bulk transport protocol for multihop wireless networks", Proceedings of the 5th International Conference on Embedded Networked Sensor Systems (SenSys '07), pp. 351-365, Nov. 2007.
Kleinrock, et al.,"Packet Switching in Radio Channels: Part I—Carrier Sense Multiple-Access Modes and Their Throughput-Delay Characteristics", IEEE Transactions on Communications, 23(12):1400-1416, Dec. 1975.
Kodialam, et al., "Fast and reliable estimation schemes in RFID systems", Proceedings of the 12th Annual International Conference on Mobile Computing and Networking (MobiCom '06), pp. 322-333, Sep. 2006.
Koomey, JG et al., "Implications of Historical Trends in the Electrical Efficiency of Computing", IEEE Annals of the History of Computing, 33(3):46-54, Aug. 2011.
Kuester, et al., "Baseband Signals and Power in Load-Modulated Digital Backscatter," IEEE Antenna and Wireless Propagation Letter, vol. II, 2012, pp. 1374-1377, Nov. 2012.
Lazarus, "Remote, wireless, ambulatory monitoring of implantable pacemakers, cardioverter defibrillators, and cardiac resynchronization therapy systems: analysis of a worldwide database", Pacing and Clinical Electrophysiology, 30(Suppl 1):S2-S12, Jan. 2007.
Liang, et al., "Surviving wi-fi interference in low power zigbee networks", Proceedings of the 8th ACM Conference on Embedded Networked Sensor Systems (SenSys '10), pp. 309-322, Nov. 2010.
Liu, et al.,"Ambient Backscatter: Wireless Communication Out of Thin Air," University of Washington, date retrieved Jan. 11, 2016, pp. 1-12.
Liu, et al.,"Ambient Backscatter: Wireless Communication out of Thin Air", Proceedings of the Association for Computing Machinery (ACM) 2013 Conference on Special Interest Group on Data Communications (SIGCOMM), pp. 39-50, also in ACM SIGCOMM Communication Review, 43(4):39-50, Aug./Oct. 2013.
Liu, et al.,"Digital Correlation Demodulator Design for RFID Reader Receiver", IEEE Wireless Communications and Networking Conference (WCNC 2007), pp. 1666-1670, Mar. 2007.
Liu, et al.,"Enabling Instantaneous Feedback with Full-duplex Backscatter", Proceedings of the 20th Annual International Conference on Mobile Computing and Networking (MobiCom'14), pp. 67-78, Sep. 2014.
Mace, "Wave reflection and transmission in beams", Journal of Sound and Vibration, 97(2):237-246, Nov. 1984.
Mastrototaro, "The MiniMed Continuous Glucose Monitoring System", Diabetes Technology & Therapeutics, 2(Suppl 1):13-18, Dec. 2000.
Metcalfe, et al., "Ethernet: Distributed packet switching for local computer networks", Communications of the ACM, 19(7):395-404, Jul. 1976.
Mishra, et al,, "Supporting continuous mobility through multi-rate wireless packetization", Proceedings of the 9th Workshop on Mobile Computing Systems and Applications (HotMobile '08), pp. 33-37, Feb. 2008.
Mutti, et al.,"CDMA-based RFID Systems in Dense Scenarios: Concepts and Challenges", 2008 IEEE International Conference on RFID, pp. 215-222, Apr. 2008.
Nikitin, et al., "Passive tag-to-tag communication", 2012 IEEE International Conference on RFID (RFID), pp. 177-184, Apr. 2012.
Nikitin, et al.,"Theory and measurement of backscattering from RFID tags", IEEE Antennas and Propagation Magazine, 48(6):212-218, Dec. 2006.
Obeid, et al., "Evaluation of spike-detection algorithms for a brain-machine interface application", IEEE Transactions on Biomedical Engineering, 51(6):905-911, Jun. 2004.
Occhiuzzi, et al., "Modeling, Design and Experimentation of Wearable RFID Sensor Tag", IEEE Transactions on Antennas and Propagation, 58(8):2490-2498, Aug. 2010.

(56) References Cited

OTHER PUBLICATIONS

Pandey, et al., "A Sub-100 µW MICS/ISM Band Transmitter Based on Injection-Locking and Frequency Multiplication", IEEE Journal of Solid-State Circuits, 46(5):1049-1058, May 2011.
Parks, et al., "A wireless sensing platform utilizing ambient RF energy", 2013 IEEE Topical Conference on Biomedical Wireless Technologies, Networks, and Sensing Systems (BioWireleSS), pp. 154-156, Jan. 2013.
Parks, Aaron N. et al.,"Turbocharging Ambient Backscatter Communication", SIGCOMM, Aug. 2014, 1-12.
Pillai, et al.,"An Ultra-Low-Power Long Range Battery/Passive RFID Tag for UHF and Microwave Bands With a Current Consumption of 700 nA at 1.5 V", IEEE Transactions on Circuits and Systems I: Regular Papers, 54(7):1500-1512, Jul. 2007.
Qing, et al.,"A folded dipole antenna for RFID", IEEE Antennas and Propagation Society International Symposium, 1:97-100, Jun. 2004.
Rabaey, et al., "PicoRadios for wireless sensor networks: the next challenge in ultra-low power design", 2002 IEEE International Solid-State Circuits Conference, Digest of Technical Papers (ISSCC), 1:200-201, Feb. 2002.
Ransford, et al., "Mementos: system support for long-running computation on RFID-scale devices", ACM SIGPLAN Notices—Proceedings of the 16th International Conference on Architecturla Support for Programming Languages and Operating Systems (ASPLOS '11), 46(3):159-170, Mar. 2011.
Rao, KVS et al., "Antenna design for UHF RFID tags: a review and a practical application", IEEE Transactions on Antennas and Propagation, 53(12):3870-3876, Dec. 2005.
Roy, et al., "RFID: From Supply Chains to Sensor Nets", Proceedings of the IEEE, 98(9):1583-1592, Jul. 2010.
Sample, et al.,"Design of an RFID-Based Battery-Free Programmable Sensing Platform", IEEE Transactions on Instrumentation and Measurement, 57(11):2608-2615, Nov. 2008.
Sample, et al., "Experimental results with two wireless power transfer systems", IEEE Radio and Wireless Symposium (RAWCON), pp. 16-18, Jan. 2009.
Seigneuret, et al., "Auto-tuning in passive UHF RFID tags", 2010 8th IEEE International NEWCAS Conference (NEWCAS), pp. 181-184, Jun. 2010.
Sen, et al., "CSMA/CN: Carrier sense multiple access with collision notification", Proceedings of the 16th Annual International Conference on Mobile Computing and Networking (MobiCom'10), pp. 25-36, Sep. 2010.
Smith, Jr et al., "A wirelessly-powered platform for sensing and computation", ACM International Joint Conference on Pervasive and Ubiquitous Computing (UbiComp 2006), 4206:495-506, Sep. 2006.
So, et al., "Multi-channel mac for ad hoc networks; handling multi-channel hidden terminals using a single transceiver", Proceedings of the 5th ACM International Symposium on Mobile Ad Hoc Networking and Computing, pp. 222-233, May 2004.
Srinivasan, et al., "An empirical study of low-power wireless", ACM Transactions on Sensor Networks (TOSN), vol. 6, Issue 2, Article No. 16, Feb. 2010.
Thomas, et al., "A 96 Mbit/sec, 15.5 pJ/bit 16-QAM modulator for UHF backscatter communication", 2012 IEEE International Conference on RFID (RFID), IEEE RFID Virtual Journal, pp. 185-190, Apr. 2012.
Tubaishat, et al., "Sensor networks: an overview", IEEE Potentials, 22(2):20-23, Apr.-May 2003.
Walden, "Analog-to-digital converter survey and analysis", IEEE Journal on Selected Areas in Communications, 17(4):539-550, Apr. 1999.
Welbourne, et al., "Building the Internet of Things Using RFID: The RFID Ecosystem Experience", IEEE Internet Computing, 13(3):48-55, May-Jun. 2009.
Wuu, et al.,"Zero-Collision RFID Tags Identification Based on CDMA", 5th International Conference on Information Assurance and Security (IAS'09), pp. 513-516, Aug. 2009.
Yi, et al. ,"Analysis and Design Strategy of UHF Micro-Power CMOS Rectifiers for Micro-Sensor and RFID Applications", IEEE Transactions on Circuits and Systems I: Regular Papers, 54(1):153-166, Jan. 2007.
Zalesky, et al.,"Integrating segmented electronic paper displays into consumer electronic devices", 2011 IEEE International Conference on Consumer Electronics (ICCE), pp. 531-532, Jan. 2011.
Zhang, et al., "Frame retransmissions considered harmful: improving spectrum efficiency using micro-ACKs", Proceedings of the 18th Annual International Conference on Mobile Computing and Networking (MobiCom '12), pp. 89-100, Aug. 2012.
U.S. Appl. No. 15/601,836, entitled "Ambient Backscatter Tranceivers, Apparatuses, Systems, and Methods for Communicating Using Backscatter of Ambient RF Signals", filed May 22, 2017.
Unpublished PCT Application No. PCT/US2017/057207, entitled "Backscatter Systems, Devices, and Techniques Utilizing CSS Modulation and/or Higher Order Harmonic Cancellation," filed Oct. 18, 2017, pp. all.
Cadence, "Cadence Spectre RF Option", http://www.cadence.com/products/rf/spectre_rf_simulation/pages/default.aspx. (Retrieved Jul. 19, 2018).
DigiPoints. DigiPoints Series vol. 1 Leader Guide Module 9—Network Architectures. Sep. 18, 2015, pp. 9.i-9.18.
IEEE, "IEEE Standard for Ethernet", http://standards.ieee.org/getieee802/download/802.11-2012.pdf., Dec. 28, 2012.
Maxim Integrated, "2.4GHz to 2.5GHz 802.11 g/b FR Transceiver, PA, and Rx/Tx/Antenna Diversity Switch", https://datasheets.maximintegrated.com/en/ds/MAX2830.pdf. (Retrieved Jul. 19, 2018).
NASA, "A Wi-Fi Reflector Chip to Speed Up Wearables", http://www.jpl.nasa.gov/news/news.php?feature=4663. Jul. 22, 2015.
PCT Application No. PCT/US2018/026545 titled 'Image and/or Video Transmission Using Backscatter Devices' filed on Apr. 6, 2018.
Qualcomm, "AR9462 Single-chip, 2.4/5GHz, 2-stream 802.11a/b/g/n and BT 4.0 + HS SoC Solution with SST Technology", http://www.qca.qualcomm.com/wp-content/uploads/2013/11/AR9462.pdf. (Retrieved Jul. 19, 2018).
Qualcomm, "QCA4002/4004 Qualcomm low-power Wi-Fi", http://www.eeworld,corn.cn/zt/wireless/downloads/QCA4002-4004FIN.pdf. (Retrieved Jul. 19, 2018).
Synopsys, "Concurrent Timing, Area, Power and Test Optimization", http://www.synopsys.com/Tools/Implementation/RTLSynthesis/DesignCompiler/Pages/default.aspx. (Retrieved Jul. 19, 2018).
U.S. Appl. No. 16/072,858, titled "Backscatter Devices Including Examples of Single Sideband Operations", filed Jul. 25, 2018.
"Altera de1 fpga development board", http://www.terasic.com.tw/cgi-bin/page/archive.pl?No=83.(Retrieved Jul. 19, 2018).
"Analog Devices HMC190BMS8/190BMS8E", https://www.hittite.com/content/documents/data_sheet/hmc190bms8.pdf. (Retrieved Jul. 19, 2018).
"Nest Cam Indoor", https://nest.com/camera/meet-nest-cam/?dropcam=true, 2018. (Retrieved Jul. 19, 2018).
U.S. Appl. No. 15/958,880 titled 'Apparatuses, Systems, and Methods for communicating Using MIMO and Spread Spectrum Coding in Backscatter of Ambient Signals', filed Apr. 20, 2018.
Bharadia, et al., "Backfi: High Throughput WiFi Backscatter", In Proceedings of the 2015 ACM Conference on Special Interest Group on Data Communication, Aug. 2015.
Chen, et al., "Pulse-Modulation Imaging—Review and Performance Analysis", IEEE Transactions on Biomedical Circuits and Systems, vol. 5, No. 1, Feb. 2011, at 64.
Chokshi, et al., "Yes! Wi-Fi and Bluetooth Can Coexist in Handheld Devices", Emerging and Embedded Business Unit, Marvell Semiconductor, Inc., Mar. 2010.
Ensworth, et al., "Every smart phone is a backscatter reader: Modulated backscatter compatibility with bluetooth 4.0 low energy (ble) devices". 2015 IEEE International Conference on RFID. (Retrieved Jul. 19, 2018).
Greene, et al., "Intel's Tiny Wi-Fi Chip Could Have a Big Impact". MIT Technology review, Sep. 21, 2012.
Javed, et al., Background Subtraction Via Superpixel-Based Online Matrix Decomposition With Structured Foreground Constraints, (56) References Cited

OTHER PUBLICATIONS

ICCVW '15 Proceedings of the 2015 IEEE International Conference on Computer Vision Workshop, Dec. 2015.
Kellogg, et al., "Wi-fi backscatter: Internet connectivity for rf-powered devices", In Proceedings of the 2014 ACM Conference on SIGCOMM, Aug. 2014.
Khannur, et al., "A Universal UHF RFID reader IC in 0.18-μm CMOS Technology". Solid-State Circuits, IEEE Journal of, 43(5):1146-1155, May 2008.
Lu, et al., "Enfold: Downclocking OFDM in WiFi". In Proceedings of the 20th annual international conference on Mobile computing and networking, pp. 129-140. ACM, Sep. 2014.
Lu, et al,, "Slomo: Downclocking WiFi Communication". In NSDI, pp. 255-258, Apr. 2013.
Manweiler, et al., "Avoiding the Rush Hours: Wifi Energy Management via Traffic Isolation". In MobiSys, Jul. 2011.
Merritt, "Atheros targets cellphone with Wi-Fi chip", EE Times (Nov. 2, 2009), http://www.eetimes.com/document.asp?doc_id=1172134.
Mittal, et al., "Empowering developers to estimate app energy consumption". In MobiCom, Aug. 2012.
Murray Associates, "The Great Seal Bug Part 1", Murray Associates, Mar. 2017.
Naderiparizi, et al., "Ultra-Low-Power Wireless Streaming Cameras", arXiv:1707.08718v1, Jul. 27, 2017, Cornell University Library.
Navaneethan, et al., Security Enhancement of Frequency Hopping Spread Spectrum Based on Oqpsk Technique. IOSR Journal of Electronics and Communication Engineering, May 2016. 62.
Proakis, et al., "Digital communications", 2005. McGraw-Hill, New York. (Retrieved Jul. 19, 2018).
Rattner, et al., "Connecting the Future: It's a Wireless World", Sep. 2013.
Ying, et al., "A System Design for UHF RFID Reader". In Communication Technology, 2008. ICCT 2008. 11th IEEE International Conference on, pp. 301-304. IEEE, Nov. 2008.
Zhang, et al., "EkhoNet: High Speed Ultra Low-power Backscatter for Next Generation Sensors", School of Computer Science, University of Massachusetts, Amherst, MA 01003, Sep. 2014.

* cited by examiner

WIRELESS NETWORKING COMMUNICATION METHODS, SYSTEMS, AND DEVICES OPERABLE USING HARVESTED POWER

CROSS-REFERENCE TO RELATED APPLICATION(S)

This application is a 371 National Stage Application of PCT Application No. PCT/US2015/015479, filed on Feb. 11, 2015, which claims the benefit under 35 U.S.C. § 119 of two earlier provisional applications, U.S. Ser. No. 61/938,576, filed Feb. 11, 2014 and U.S. Ser. No. 62/028,263 filed Jul. 23, 2014. All applications are hereby incorporated by reference in their entirety, for any purpose.

TECHNICAL FIELD

Examples described herein relate generally to communication systems and methods for Internet communication, and particularly, to wireless network communication at low power.

BACKGROUND

The "Internet of Things" has received a great deal of attention for its promise—objects that operate and communicate with each other when they are nearby, all possibly without the need to ever plug them in or maintain batteries. Existing technologies, however, lack the ability to connect to the Internet in a sufficiently lower power manner to make this vision possible.

Conventional radio communication may consume orders of magnitude more power than may be desirable. Conventional Wi-Fi transceivers even may require much more power than is available from examples of energy harvesting technologies. Ambient backscatter technologies may enable device-to-device communication, but may create an isolated network disconnected from the Internet.

DETAILED DESCRIPTION

Examples described herein include devices, systems, and methods for communication systems that may provide wireless networking communications at sufficiently lower power to be suitable for use in devices employing power harvesting (e.g. RF power harvesting) for power. Of course, the examples described herein may also find use for wireless communication in conventionally powered devices (e.g. those with batteries or requiring AC power supplies).

Generally, example devices described herein include endpoint devices (e.g. tags) which may communicate with another wireless communication device (e.g. access point device) by modulating a channel associated with the wireless communication to encode transmit data. The channel modulation may be performed by utilizing a switch to control an impedance of an antenna at the endpoint device to either reflect or absorb wireless network communication signals received by the endpoint device. For example, reflecting a packet of wireless network communication signals may at least partially indicate a '1' while absorbing a packet may at least partially indicate a '0', or vice versa. The wireless communication device (e.g. access point device) may extract the transmit data by decoding changes in the channel caused, at least in part, by the modulation.

Similarly, communication may occur from the access point device(s) to endpoint device(s). Access point devices may transmit a pattern of packets (e.g. Wi-Fi packets)—the presence of a packet in a time slot may indicate a '1' while the absence of a packet may indicate a '0', or vice versa. Endpoint devices may decode this data by using an energy detector to differentiate between the presence or absence of a packet.

In this manner, example systems and device described herein may facility very low power communication in accordance with conventional wireless communication standards (e.g. Wi-Fi). Such low power communication may allow power-harvesting devices (e.g. RF-powered devices) to communicate with commodity wireless communication devices (e.g. Wi-Fi devices).

Figure 1:
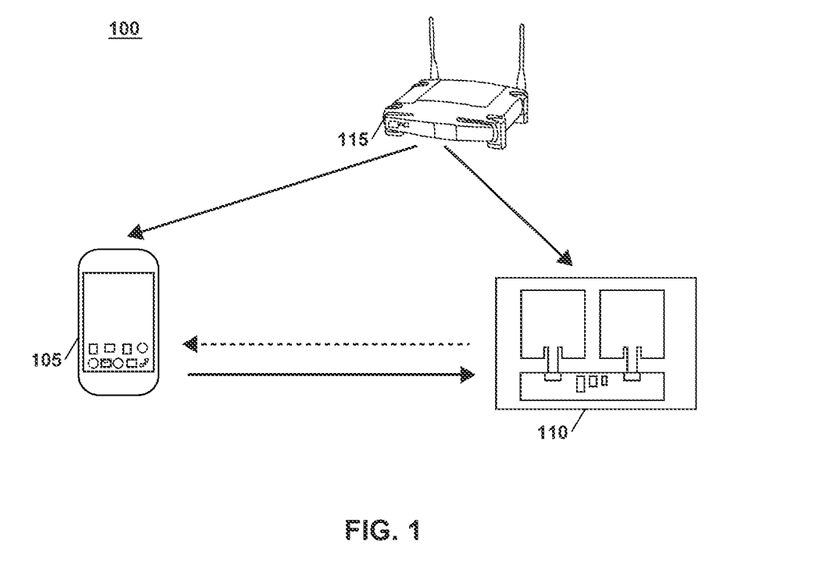
FIG. 1 is a schematic illustration of a system in accordance with examples described herein.

FIG. 1 is a schematic illustration of a system in accordance with examples described herein. The system 100 includes an access point device 105, an endpoint device 110, and a wireless network communication signal source 115. Examples will be described which facilitate wireless networking communications between the endpoint device 110 and the access point device 105. While a wireless network communication signal source 115 is shown in FIG. 1, in other examples the wireless network communication signal source 115 may not be needed, and the access point device 105 may provide the wireless network communication signals described as coming from the wireless network communication signal source 115, for example in situations where the access point device 105 has a capability to receive wireless network communication signals initiated form the access point device 105 itself.

The access point device 105 is shown in FIG. 1 implemented as a mobile phone. In other examples, other computing devices (e.g. any Wi-Fi client) may be used additionally or instead to implement access point devices described herein, including, but not limited to, laptop or desktop computers, tablets, servers, routers, game consoles, set top boxes, wearable devices, automobiles, or appliances. Generally, access point devices may include one or more processing units, such as one or more processors, and memory encoded with executable instructions that, when executed, may cause the access point device to perform some or all of the functions described herein. Examples of access point devices described herein generally have Internet connectivity by way of wireless networking communication signals and/or a wired Internet connection.

The endpoint device 110 is shown in FIG. 1 implemented as a tag. Generally, the tag may include an antenna and may be powered by energy harvested from the environment, such as an RFID sensor tag. In other examples, generally any circuitry or computing device may be used additionally or instead to implement the endpoint device 110. The endpoint device 110 may connect to the Internet in a very low power manner using examples of techniques described herein to send data to the access point device 105. Accordingly, generally any circuitry or computing device for which low power Internet connectivity is desirable may be used to implement the endpoint device 110. The endpoint device 110 may harvest power from an environment in which the endpoint device 110 is located. For example, the endpoint device 110 may be RF-powered from sources such as TV, cellular, and/or Wi-Fi signals, and/or the endpoint device may be powered by solar, mechanical, vibrational, thermal, tidal or other environmental energy sources. In some examples, the endpoint device 110 may be powered through batteries or AC or DC power sources. Devices where power is environmentally harvested may have a particular need for low power Internet connectivity techniques such as those described herein, as the power available from these sources may be limited. Any number of endpoint devices 110 may be included in example systems, and in some examples the endpoint devices may be embedded in or on objects (e.g. personal possessions, portions of buildings or rooms, clothing, pets).

The wireless network communication signal source 115 is shown in FIG. 1 implemented as a router, however generally any device which may be a source of wireless network communication signals may be used, such as but not limited to, mobile phones, laptop or desktop computers, tablets, servers, routers, game consoles, set top boxes, wearable devices, automobiles, or appliances. The wireless network communication signals provided by the wireless network communication signal source 115 are generally signals compatible with one or more wireless network standards, e.g. Wi-Fi signals such as those in compliance with one or more IEEE 802.11 standard. In some examples, the wireless network communication signal source 115 may not be needed, such as in examples where the access point device 105 is capable of transmitting wireless network communication signals and receiving those same signals.

In some examples, a wireless network communication signal source may include multiple antennas. The multiple antennas may be used to increase uplink reliability (e.g. reliability of transmissions from an endpoint device to an access point device). An effective measure of the signal from the endpoint device is the power of the endpoint device's backscattered signal (e.g. channel modulation) in relation to the power in the wireless networking communication signals at the access point device coming directly from the signal source. If the signal source can pick beamforming values on two antennas to be the vector [1,α], the effective channel to the endpoint device from the signal source is given by $h_{h1t}+h_{h2t}\alpha$, where $h_{1t}$ and $h_{h2t}$ are the channels from the two signal source antennas to the endpoint device. Similarly, the channel from the signal source to the access point device is $h_{h1r}+h_{h2r}\alpha$. If the signal source backscatters a fraction of energy β towards the access point device and the channel to the access point device is given by $h_{tr}$, then the signal source may select values of a that satisfy:

$$\alpha_{optimal} = \text{argmax}_\alpha \frac{\beta h_{tr}|h_{h1t} + h_{h2t}\alpha|}{|h_{h1r} + h_{h2r}|}$$

Examples described herein include communication between one or more endpoint devices with one or more access point devices, such as between the endpoint device 110 and access point device 105 of FIG. 1, using wireless network communication signals (e.g. Wi-Fi signals) provided by the wireless network communication signal source 115. In this manner, Internet connectivity may be supplied to the endpoint device 110 in a low power manner. Examples described herein include uplinks between an endpoint device and an access point device and downlinks between the access point device and the endpoint device. While generally examples are provided using a single access point device and a single endpoint device, example systems may include multiple access point devices and/or multiple endpoint devices. In examples having multiple endpoint devices, an access point device (e.g. access point device 110 of FIG. 1 may utilize protocols similar to EPC Gen-2 to identify the endpoint devices and query them individually. Similarly, while only one wireless network communication signal source 115 is shown in FIG. 1, any number may be used, and as mentioned previously, in some examples, the wireless network communication signal source 115 may not be required.

Generally, endpoint devices described herein may communicate by modulating received transmissions (e.g. wireless network communication signals received by a signal source, such as the wireless network communication signal source 115 of FIG. 1). Access point devices described herein may decode the transmissions using channel measurements created on received wireless network communication signals. Access point devices described herein may communicate with endpoint devices by transmitting a pattern of packets—the presence of a packet may indicate a '1', while the absence of a packet may indicate a '0', or vice versa. Endpoint devices may decode the data from access point devices using an energy detector to differentiate between the presence and absence of packets.

Figure 2:
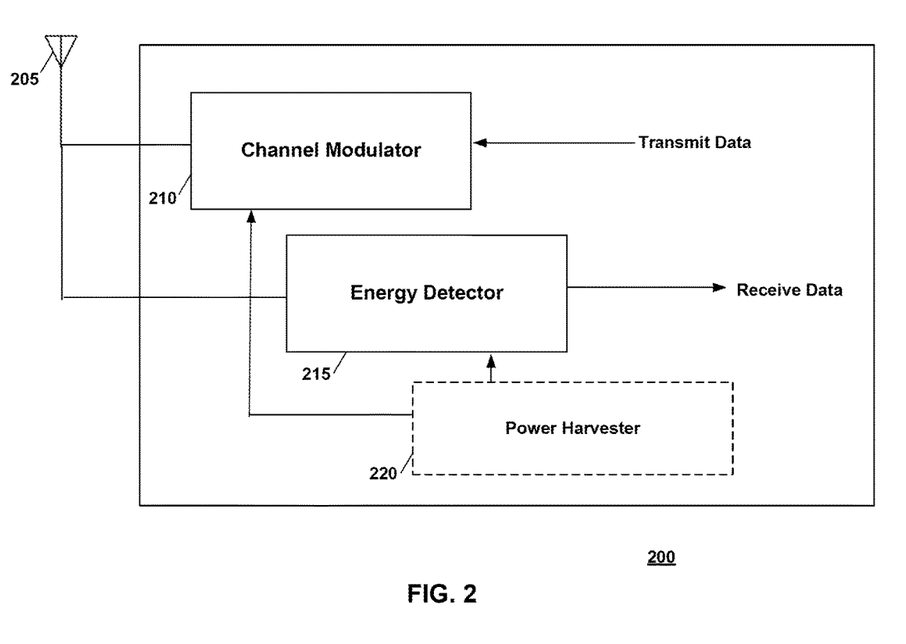
FIG. 2 is a schematic illustration of an endpoint device arranged in accordance with examples described herein.

FIG. 2 is a schematic illustration of an endpoint device arranged in accordance with examples described herein. The endpoint device 200 includes an antenna 205, a channel modulator 210, an energy detector 215, and a power harvester 220. Other components may be included in other examples, including one or more processing unit(s) and memory encoded with executable instructions that, when executed, cause the one or more processing unit(s) to perform one or more of the endpoint device functions described herein. The endpoint device 200 may be used to implement the endpoint device 110 of FIG. 1.

The channel modulator 210 may modulate a wireless network communication signal channel (e.g. a Wi-Fi channel) in accordance with data to be transmitted to an access point device. Modulation of the wireless network communication signal channel may refer to a change in the channel measurements for that channel as received by the receiving device (e.g. an access point device). For example, the channel modulator 210 may change an impedance of the antenna 205 in accordance with transmit data to be sent to an access point device (e.g. the access point device 105 of FIG. 1). The impedance affects the amount of signal, e.g. wireless communication signal received from a wireless communication signal source, reflected by the endpoint device. In this manner, the endpoint device 200 may convey a '1' or a '0' by setting an impedance of the antenna 205 to a particular amount associated with either value (e.g. a high antenna impedance may indicate a '1' while a low antenna impedance may indicate a '0', or vice versa). Changing the independence of the antenna 205 accordingly may change the channel as seen by the access point device (e.g. access point device 105), and those channel changes may be decoded by the access point device to recover the transmit data. The channel modulator 210 may be implemented using a switch (e.g. a transistor), which in some examples may consume a low amount of power (e.g. 1 μW in one example).

The switch may, for example, close to provide a low impedance and open to provide a high impedance. The switch may be selected to operate in the frequencies of interest for the wireless network communication signals (e.g. over the 2.4 GHz Wi-Fi band).

The channel modulator 210 may include a controller (e.g. control circuitry) to control a length of time the antenna impedance is maintained at a particular state indicative of a bit of transmit data. In some examples, a minimum period with which the impedance changes is larger than the duration of a packet of the wireless network communication signals (e.g. a Wi-Fi packet). In some examples, the minimum period is larger than the duration of 2, 3, or 4 packets. In this manner, the act of modulating may not change the channel within every packet, which may allow nearby wireless communication to proceed with minimal interference.

In some examples, the channel modulator 210 may modulate fast enough to effect bits within a particular packet of wireless networking communication signals. In this manner, the channel modulator 210 may be used to cause perturbations in modulation constellations (e.g. OFDM modulation), such as bit error rate, for example. A decoder at the access point device may be used to decode these perturbations into the received data.

The antenna 205 may be implemented using generally any antenna suitable for receiving wireless network communication signals and having altered impedance. Suitable antennas include monopoles and dipoles. In some examples, a micro strip patch antenna may be used which may provide for a higher gain relative to antenna size. In one example, a micro strip patch antenna is used where the patches each resonate at a frequency of interest (e.g. 2.4 GHz), but which act together to collaboratively scatter incident RF, therefore producing a larger change in the antenna's radar cross section when an impedance of the antenna is changed. Larger change in antenna metrics responsive to a change in antenna impedance will generally result in an easier detection process at the access point device as the difference between a '1' and '0' may be easier to discern when larger changes are affected by the endpoint device. Moreover, larger change in antenna metrics responsive to a change in impedance may also influence the impact of the endpoint device on any other nearby receivers.

In some examples, the endpoint device 200 may include multiple antennas. In some examples, multiple antennas may be leveraged to steer the direction of backscatter (e.g. channel modulation). In some examples, a phase may be introduced at one of the antennas that may be used to steer the signal direction. In some examples, a predetermined amount of phase may be available using switches incorporated in the endpoint device 200 and coupled to at least one of the antennas. The endpoint device 200 may select among different predetermined phase amounts that may optimize an amount of energy β backscattered toward an access point device.

The power harvester 220 may be coupled to the channel modulator 205 and/or the energy detector 215 and may provide power for those components. The power harvester 220 may generally be implemented using any circuitry or other components for harvesting energy from an environment—e.g. solar, mechanical, vibrational, thermal, tidal or other environmental energy sources. In some examples, the power harvester 220 may power the channel modulator 210 and/or the energy detector 215 using power harvested from RF signals received by the antenna 205.

During operation of an uplink communication from the endpoint device 200, the endpoint device 200 may receive wireless network communication signals from another device—e.g. from the wireless network communication signal source 115 of FIG. 1 and/or from the access point device 105 of FIG. 1. The wireless network communication signals may be received at the antenna 205. Transmission of the wireless network communication signals may be caused by the access point device 105 when the access point device 105 wants to query the endpoint device 110 or 200. For example, the access point device 105 may request that the wireless network communication signal source 115 provide signals, for example by requesting a file download or other data be transmitted from the wireless network communication signal source. In some examples, beacon packets sent from the wireless network communication signal source 115 may be used, which may not require a particular request for data transmission from the access point device. The endpoint device 200 may receive, or have stored, transmit data for transmission to an access device, e.g. the access device 105 of FIG. 1. In accordance with the transmit data, the channel modulator 205 may modulate the channel by altering an impedance of the antenna 205. In some examples, the impedance of the antenna is held constant for each bit for a period of time which may be greater than a packet of the wireless network communication signals in order to reduce interference. In some examples, the channel modulator 205 may modulate the channel only or mostly responsive to queries by an access point device. In some examples, the endpoint device 205 may include control circuitry which may adapt the modulation rate (e.g. increase a duration of each bit of transmit data) in accordance with network traffic conditions.

In this manner, '1's and '0's which make up the transmit data may be transmitted by the endpoint device 200 by setting an impedance of the antenna 205 to a first value to indicate a '1', and to a second value to indicate a '0'. The changes in antenna impedance may be detected at the access point device as changes in the wireless network communication signal channel as seen by the access point device.

The transmit data may in some examples include a known preamble which may be used by a receiving device to perform correlation to, for example, select a particular channel or sub-channel for use in decoding the transmit data. In some examples, the transmit data may include two orthogonal codes of length L each to represent the one and the zero bits. The receiving device may correlate a channel measurement with the two codes to decode the transmit data.

Figure 3:
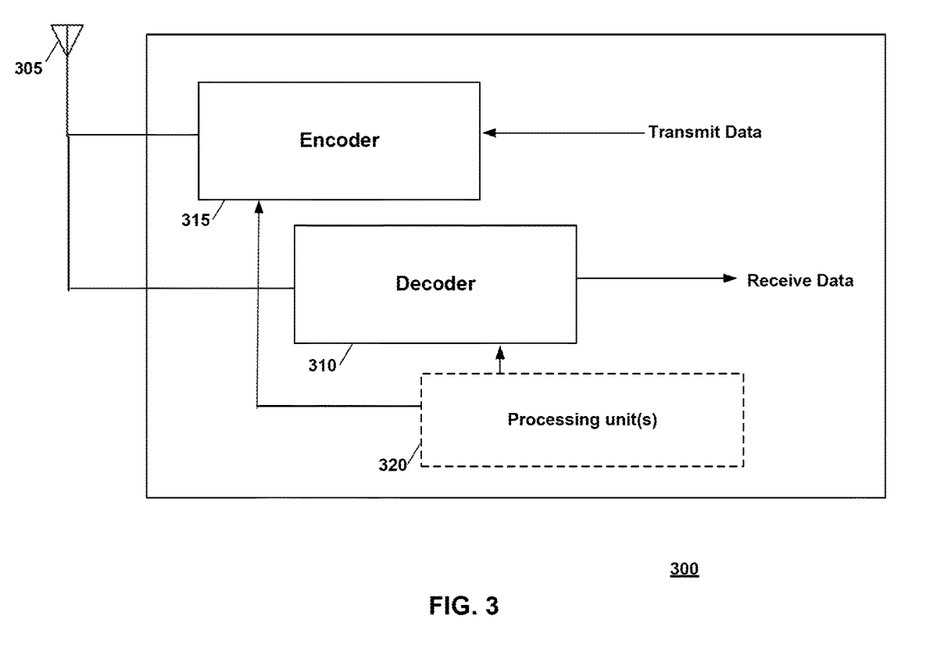
FIG. 3 is a schematic illustration of an access point device arranged in accordance with examples described herein.

FIG. 3 is a schematic illustration of an access point device arranged in accordance with examples described herein. The access point device 300 includes an antenna 305, a decoder 310, an encoder 315, and one or more processing units 320. Other components may be included in other examples, including but not limited to network interfaces, user interfaces, keyboards, displays, and sensors. The access point device 200 may be used to implement the access point device 105 of FIG. 1. In one example, the access point device 200 may be implemented using an Intel Wi-Fi Link 5300 card.

Recall that endpoint devices as described herein, such as the endpoint device 110 of FIG. 1 or the endpoint device 200 of FIG. 2, may modulate a channel associated with wireless network communication signals. The wireless network communication signals may be provided by an access point device in some examples and/or by a wireless network communication signal source in some examples. Variations in the channel may be detected by an access point device, such as the access point device 300, and decoded to generate receive data at the access point device that corresponds with the transmit data transmitted by the endpoint device.

In this manner, the antenna 305 of the access point device 300 may receive wireless network communication signals provided by a wireless network communication signal source (e.g. the wireless network communication signal source 115 of FIG. 1 or by the access point device 300 itself). While one antenna 305 is shown in FIG. 3, the access point device 300 may utilize multiple antennas in some examples. The decoder 310 may decode channel measurements associated with the wireless network communication signals into receive data provided by an endpoint device, such as the endpoint device 200 of FIG. 2 or the endpoint device 110 of FIG. 1.

The decoder 310 may be implemented using hardware, software, or combinations thereof. In some examples, the decoder may programmed to provide the functionality described herein. For example, the decoder 310 be implemented using at least one processing unit, such as the processing unit 320 of FIG. 3 and a memory encoded with executable instructions for decoding, that when executed, cause the at least one processing unit to decode the channel measurements into the receive data.

The channel measurements which may be modulated by examples of endpoint devices described herein and decoded into receive data may include, but are not limited to, signal strength, channel state information (CSI), received signal strength information (RSSI), or combinations thereof.

The decoder 310 may perform signal conditioning to reduce or remove variations in measured channel measurements due to mobility in the environment. However, in some examples, signal conditioning may not be used. Signal conditioning, if used, generally aims to remove temporal variations in the channel state information due to mobility in the environment and to normalize the channel state information to, e.g. +1 and −1 values. To remove or reduce temporal variation in channel state information, a moving average may be subtracted from the channel state information measurements. In one example, the moving average is computed over 400 ms. The decoder 310 may additionally or instead normalize channel state measurements such that the channel state information corresponding to a one bit from the endpoint device maps to a +1 and that the channel state information corresponding to a zero bit from the endpoint device maps to a 0. The decoder 310 may perform normalization, for example, by computing absolute values of the channel state measurements and taking their average. The decoder 310 may then divide the channel state information by the average to get the normalized channel state information.

The decoder 310 may leverage frequency diversity across sub-channels of the wireless network communication signals. For example, the decoder 310 may identify at least one sub-channel of the wireless network communication signals for use in decoding the channel state information. Some sub-channels may experience a stronger effect of the modulation by the endpoint device. Accordingly, in some examples, the decoder 310 may identify one or more sub-channels having a more pronounced effect of the modulation by the endpoint device. In some examples, the sub-channels having a more pronounced effect may vary with the position of the endpoint device, however the identification of these channels may vary with the position of the endpoint device.

Accordingly, in some examples the decoder 310 may identify one or more sub-channels for decoding each time an uplink transmission is expected and/or received. To identify the sub-channel(s) to use for decoding, the decoder 310 may perform correlation with a known preamble. For example, endpoint devices, such as the endpoint device 200 may be configured (e.g. programmed) to transmit a known preamble at the beginning of a message transmission. The access point device 300 may receive the transmission (e.g. by correlating received signals with the known preamble). The decoder 310 may sort sub-channels in accordance with their correlation value. A top number of sub-channels having preferred correlation values may be selected for decoding (e.g. 10 sub-channels).

The decoder 310 may combine channel state information detected for each of the sub-channels, or each of the selected sub-channels in some examples. The channel state information may be combined in some examples by summing the channel state information. However, the noise variance may vary across the sub-channels. Accordingly, in some examples the decoder 310 may combine the channel state information across the sub-channels by computing a weighted average where the sub-channels with low noise variance are given a higher weight while those with a higher noise variance are given a lower weight. This can be expressed as a linear combination of the normalized channel state information across selected sub-channels weighted with the noise variance, as indicated in the below equation:

$$CSI_{weighted} = \sum_{i=1}^{G} \frac{CSI_i}{\sigma_i^2}$$

Where CSI is the normalized CSI computed on the ith selected sub-channel, G is the total number of selected sub-channels, and $\sigma^2_i$ is the noise variance in the ith selected channel. Generally, the above relationship gives a larger weight to sub-channels where the noise variance is low. In examples where the access point device includes multiple antennas, the decoder 310 may evaluate the above equation for each antenna and a summation taken across antennas.

The decoder 310 may decode bits from the received channel state information. The received channel state information may be conditioned and taken from selected sub-channels as described herein. The decoder 310 may then decode bits—e.g. 1s and 0s from the channel state information. In some examples, the decoder 310 may utilize a thresholding mechanism, which may be performed on the summed and weighted (e.g. $CSI_{weighted}$) values in some examples. For example, if the $CSI_{weighted}$ is greater than zero, the decoder decodes a '1', and the decoder decodes a '0' otherwise.

Recall that example endpoint devices described herein modulate a channel for each transmitted bit for a length of time longer than one wireless network communication packet, and in some examples longer than multiple packets. Accordingly, the decoder 310 may address noise in the channel state information measurements in part by conducting majority voting across a plurality of channel state information measurements to more accurately identify a bit. Each bit, however may be reflected in a variable number of packets, at least because the wireless networking communication signals sent by the signal source and whose channel is modulated by the endpoint device may be bursty. Accordingly, the decoder 310 may utilize a timestamp in each packet header to group the packets belonging to a same bit transmission, then perform majority voting over the grouped packets.

In some examples, the decoder 310 may utilize a hysteresis mechanism in decoding bits. For example, the decoder 310 may utilize a first threshold, $Thresh_0$, to identify a zero when the channel state information measurement is below the threshold, and a second threshold, $Thresh_1$, to identify a 1 when the channel state information measurement is above the threshold. In some examples, the threshold values may be $\mu\pm\sigma^2$ where $\mu$ and $\sigma$ are the mean and standard deviation of $CSI_{weighted}$ computed across packets. In this manner, spurious changes in CSI measurements may not result in changes to the decoded bits.

The channel state information values which may be utilized by the decoder include, but are not limited to received amplitude, CSI, RSSI, and combinations thereof. RSSI generally provides a single metric that provides a measure of cumulative wireless network communication signal strength across multiple sub-channels. RSSI may be a single value representing all sub-channels, accordingly sub-channel selection and summing may not be performed in some examples utilizing RSSI as the channel measurements. The decoder 310 performs analogous functions to those described above when utilizing RSSI as the channel measurements—including hysteresis, majority voting across multiple RSSI measurements, thresholding to decode, and/or combinations thereof. The RSSI information may include a single value per packet in some examples. The decoder 310 may select a particular RSSI channel in examples with multiple RSSI channels (e.g. multiple antennas). The decoder 310 may correlate with a packet preamble and select an RSSI channel having a maximum correlation value in some examples. In some examples, since RSSI is a single value representing all Wi-Fi sub-channels and RSSI bit resolution is limited, the BER performance may be improved with CSI information rather than RSSI.

In some examples, the decoder 310 may correlate channel measurements with each of two orthogonal codes having length L—one of which represents a zero bit, and one of which represents a 1 bit. The correlation having a value representing a better match is selected as an output bit. In some examples, the decoder 310 may repeat the correlation operation on multiple frequency sub-channels and selects a sub-channel providing maximum correlation peak(s). In some examples, increasing the code length L may increase communication range of the system.

During operation, the access point device 300 may utilize channel measurements associated with wireless networking communication signals from a wireless networking communication signal source, which may be different from the access point device itself. For every bit sent by an endpoint device, it may be desirable for the bit to be associated with channel measurements for multiple packets of the wireless networking communication signals. However, the rate at which wireless networking communication signals are provided by the signal source may vary. In some examples, one or more access point devices may request that the wireless networking communication signal source increase its rate of transmission in order to increase an uplink range. As the distance between endpoint device(s) and an access point device increase, the signal source may be requested to increase its transmission rate such that the probability of bit errors or other constellation perturbations induced by channel modulation at the endpoint device increases. Generally, small channel variations may create larger number of bit errors or other perturbations at higher modulation rates.

In some examples, the rate at which wireless networking communication signals are provided may vary in accordance with network traffic. The wireless networking communication signal source may provide signals at a higher rate when network traffic is low, and at a lower rate when traffic is high. In some examples, endpoint devices may identify packets from the wireless networking communication signal source and ensure that multiple packets are affected (e.g. reflected or absorbed) per bit to be transmitted from the endpoint device. However, example endpoint devices may not be able to or it may not be advantageous for the endpoint devices to decode packet headers to identify packets from the wireless networking communication signal source. Accordingly, endpoint devices may adapt their transmission rate for different network loads.

For example, the access point device 300 may compute (e.g. using at least one processing unit and memory encoded with executable instructions for conducting the computation) an average number of packets the wireless networking communication signal source can transmit under existing network conditions. Based on this average number, the access point device 300 may further compute a rate at which an endpoint device should transmit packets. For example, suppose the wireless networking communication signal source can transmit on average N packets per second given the current network load and the access point device requires the channel information from M packets to reliable decode each bit. Given these parameters, the rate at which the endpoint device should transmit bits is N/M bits per second. The access point device 300 may compute this bit rate and transmit the bitrate in a query packet addressed to the endpoint device. The endpoint device may utilize the bit rate while transmitting bits to the access point device.

Returning to the access point device 300 in FIG. 3, the encoder 315 may further be coupled to the antenna 305. The encoder 315 may be implemented using hardware, software, or combinations thereof. In some examples, the encoder may programmed to provide the functionality described herein. For example, the encoder 315 be implemented using at least one processing unit, such as the processing unit 320 of FIG. 3 and a memory encoded with executable instructions for encoding, that when executed, cause the at least one processing unit to encode the transmit data for transmission to one or more endpoint devices.

The encoder may encode the data for transmission to the endpoint device using the presence of a packet of data to indicate a '1', and the absence of a packet of data to indicate a '0', or vice versa. In this manner, the transmit data is encoded by the presence or absence of a packet in a time slot—the content of the packets is not necessarily related to the transmit data. A length of time of the absence of packets (e.g. silence period) may be equal to a time of a packet (e.g. a Wi-Fi packet).

In some examples, a '1' may be encoded by a sequence of packet lengths and a '0' by an orthogonal sequence, or vice versa. Endpoint devices may search for these sequences to decode the data.

In some examples, techniques may be used to address interfering traffic on the channel during transmissions. In some examples, the access point device and the endpoint device may scan the channel and profile packet lengths used on the channel. The access point and endpoint devices may proceed to use a subset of packet lengths that have the least probability of being used by other devices on the channel to communicate with one another.

In some examples, the encoder 315 may cause the antenna to transmit a message (e.g. a packet) configured to cause other communication devices to refrain from transmission in advance of transmitting in accordance with the data. This may reduce interference in the system, but may not be required in all examples. The device 300 may transmit a CTS_to_SELF packet before transmitting the transmit data encoded using the presence or absence of packets to indicate the transmit data. The CTS_to_SELF message is a Wi-Fi message that forces 802.11-compliant devices to refrain from communications for a specified time interval. The device 300 may leverage this message to reserve the communications medium for a duration of its transmission of transmit data to ensure or encourage other Wi-Fi devices from transmitting during the silence period which the device 300 intends to use to signify a '1' or a '0'.

Figure 4:
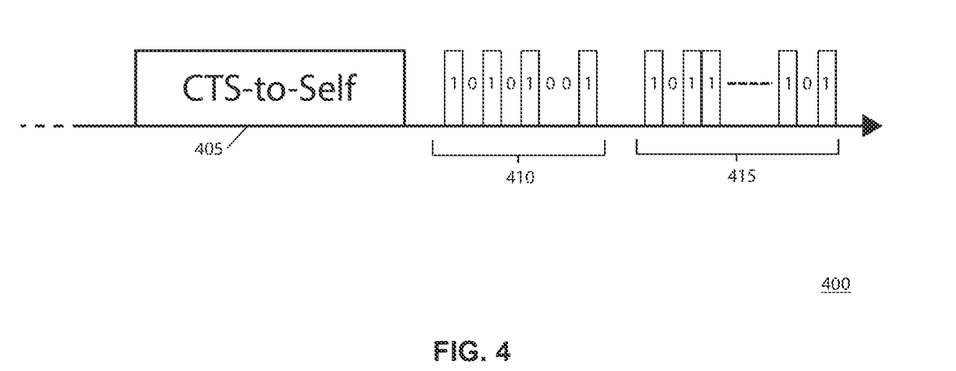
FIG. 4 is a schematic illustration of a transmission from an access point device arranged in accordance with examples described herein.

FIG. 4 is a schematic illustration of a transmission from an access point device arranged in accordance with examples described herein. The transmission 400 may be provided, for example using the antenna 305 and encoder 315 of the access point device 300 of FIG. 3. The transmission 400 may include a CTS-to-SELF packet 405. The CTS-to-SELF packet causes other transmitting devices (e.g. Wi-Fi devices) to cease transmissions for a particular amount of time. In some examples, up to a duration of 32 ms in accordance with the 802.11 standard. Following transmission of the CTS-to-SELF packet 405, transmit data may be transmitted. The transmit data may include a preamble 410 and a payload 415. In both the preamble 410 and the payload 415, the presence or absence of transmitted data may be used to encode a 0 or a 1, as shown in FIG. 4. The payload 415 may include any number of bits, and may include error checking bits, such as a CRC.

The transmission 400 may be received at one or more endpoint devices in accordance with examples described herein and decoded. For example, referring back to the endpoint device 200 of FIG. 2, an endpoint device may include an energy detector, such as the energy detector 215 of FIG. 2. Generally, the endpoint device 200 may be configured to use the energy detector 215 to differentiate between a presence and absence of a wireless networking communication signal or packet (e.g. a Wi-Fi packet) at the antenna 205. The energy detector 215 may in some examples be powered by the environment using, for example the power harvester 220.

In some examples, the energy detector 215 may compute average energy in a received signal and utilize a sensitive receiver to detect presence of energy received at the antenna 205. However, in some examples this approach may not be suitable—for example if it is not desirable to consume sufficient power to maintain the sensitive receiver. Moreover, some wireless networking communication signals (e.g. Wi-Fi) may have a high peak to average ratio. Wi-Fi has such a ratio due to being modulated using OFDM. This may make the average energy small, with occasional peaks. Accordingly, in some examples, the energy detector 215 may operate based on peak detection to decode received data.

Figure 5:
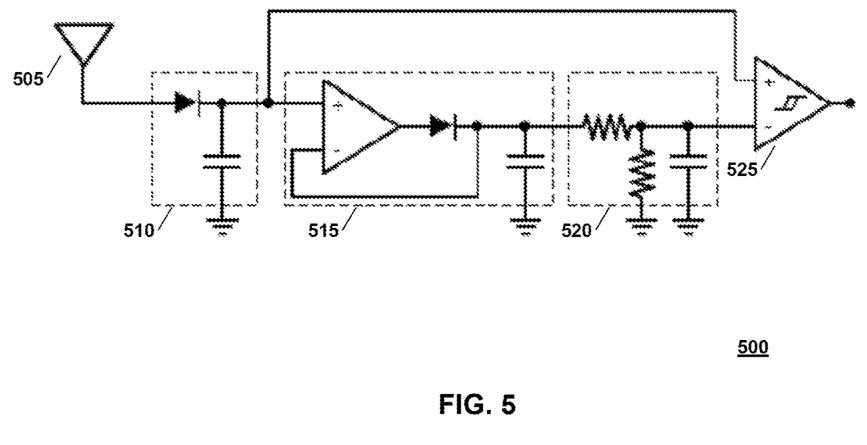
FIG. 5 is a schematic illustration of an example energy detector arranged in accordance with examples described herein.

FIG. 5 is a schematic illustration of an example energy detector arranged in accordance with examples described herein. The energy detector 500 may be used to implement the energy detector 215 of FIG. 2. The energy detector 500 may be coupled to an antenna 505, which may be used to implement the antenna 205 of FIG. 2. The energy detector 500 includes an envelope detector 510, peak finder 515, threshold setting circuit 520, and comparator 525.

The envelope detector 510 may remove a carrier frequency (e.g. 2.4 GHz) out of the received wireless networking communication signals (e.g. Wi-Fi signals). The circuit elements of the envelope detector 510 may be tuned to operate over an entire frequency range of the wireless networking communication signals (e.g. the whole 2.4 GHz Wi-Fi frequency ranges).

The peak finder 515 may capture and hold a peak amplitude of a signal received from the envelope detector 510. The peak finder 515 may include a diode, an operational amplifier, and a capacitor, as shown in FIG. 5. The capacitor may store the peak amplitudes. In some examples, in order to adapt to time-varying channel conditions, the peak value may not be held indefinitely at the capacitor. A resistor network may be used (shown in FIG. 5 as part of the threshold setting circuit 520) to dissipate the charge on the capacitor of the peak finder 515, resetting the peak detector 515 over a time interval. In some examples, the output of the peak finder 515 may be halved to produce the threshold (e.g. by operation of a capacitor shown as part of the threshold setting circuit 520).

The comparator 525 receives the threshold value from the threshold setting circuit 520 and the received signal from the envelope detector 510 and outputs a one bit whenever the received signal is greater than the threshold and a zero bit otherwise (or vice versa in other examples).

Note that in some examples the circuit of FIG. 5 may require a low amount of power to operate (e.g. around 1 µW in some examples), and therefore in some applications may be left ON at all times. However, a microcontroller requires a relatively large amount of power (several hundred µW in some examples) in active mode. The microcontroller may, for example be coupled to the comparator 525 of FIG. 5 and may receive bits output from the comparator and may act on the received data. To reduce overall power consumption, endpoint devices may place a microcontroller included in the device in a sleep state through operation in one of two modes: In a first mode, preamble detection mode, the microcontroller may be used to detect preambles at the beginning of potential reader transmissions. Note that there is generally no information in between transitions of bits output by the energy detector 500, accordingly the microcontroller may be in a sleep state until a new transition occurs at an output of the comparator 525. Intervals between transitions may be correlated by the microcontroller with reference intervals for the known preamble. If the transition intervals match the expected preamble, the microcontroller may indicate a transmission is about to begin and enter a next mode (e.g. a packet decoding mode).

In a packet decoding mode, the microcontroller may reduce power consumption by sampling the signal received, e.g. from the comparator 525, only in a middle of each bit. For example, the microcontroller may wake up briefly to capture each sample, then sleep for a period until the next bit. After expiration of the known packet length, the microcontroller may wake up to decode the packet by performing decoding operations such as framing and CRC checks, etc. for data received from one or more access point devices.

Examples of systems, devices, and methods described herein can be put to a variety of applications, and may be particularly advantageous when very low-power Internet communications at a low data rate are desired. For example, example systems described herein may be used to localize devices. An access point device (e.g. a computer, cell phone, tablet, laptop, etc.) may be used to query an endpoint device (e.g. any tagged object or any electronic object which may be out of battery power, such as a user's cell phone, etc.), and the endpoint device may respond with a location. In some examples, examples of systems described herein may be used to inform endpoint devices when to turn on. For example, a battery-powered endpoint device may communicate using techniques described herein, to identify when to wake-up (e.g. responsive to a particular command or condition), and may then wake up to consume a greater amount of power in a wakeup mode. In some examples, systems described herein may be used to implement a persistent connection, e.g. headers of email messages or text communications may be downloaded to an endpoint device with very little power expenditure.

From the foregoing it will be appreciated that, although specific embodiments of the invention have been described herein for purposes of illustration, various modifications may be made without deviating from the spirit and scope of the invention.

EXAMPLE

A prototype endpoint device, in this example a WiFID tag, was constructed and optimized to operate across 2.4 GHz Wi-Fi channels. The prototype has a 2.4 GHz antenna that can both modulate the Wi-Fi channel and harvest RF signals.

The antenna included an array of six elements, each of which is a small micro strip patch, in this example each with dimensions 40.6 by 30.9 mm, that is connected to both an RF switch and a full-wave diode rectifier that provides RF-to-DC power conversion.

The ADG902 RF switch from Analog Devices was selected for implementation of the channel modulator, due in part to its relatively broad bandwidth, low power, and good switching isolation at 2.4 GHz. Skyworks SMS7630 RF detector diodes were selected for their high rectification efficiency at low RF power levels. The antenna is connected to an MSP430G2553 running custom firmware with receive and transmit logic implementations.

On the uplink, a hardware timer module of the TIMSP430 microcontroller is used to generate a bit clock and drives a simple firmware module. Each packet includes a WiFID preamble, payload and a postamble. The access point device uses the preamble and postamble to recover the bit clock from the transmitted signals. A 13-bit Barker code is used that is known for its good auto-correlation properties.

For the downlink, the circuit design of the energy detector in FIG. 5 was implemented to identify the presence of Wi-Fi packets. Each packet has a preamble, a payload, and a postamble. The power consumption of the transmit circuit is 0.65 µW, while that of the receiver circuit is 9.0 µW. Results showed that the Wi-Fi power harvester can continuously run both the transmitter and receiver from a distance of one foot from the Wi-Fi reader. Additionally, in a dual-antenna system with both Wi-Fi and TV harvesting, the full system could be powered with a duty cycle of around 50% at a distance of 10 km from a TV broadcast tower, independent of the distance from the access point device.

What is claimed is:

1. A device comprising:
   an antenna, the antenna configured to receive wireless network communication signals provided by another device;
   a channel modulator configured to modulate a channel associated with the wireless communication signals, wherein the channel modulator is configured to modulate the channel by adjusting an impedance of the antenna in accordance with transmit data for transmission to the another device, wherein a first time during which the channel is modulated for each bit of transmit data is greater than a second time required for transmission of a plurality of packets of the wireless network communication signals.

2. The device of claim 1, wherein the channel modulator is configured to modulate the channel by altering channel measurements for the wireless network communication signals received by the another device.

3. The device of claim 1, wherein the channel modulator is configured to modulate the channel responsive to a query by the another device.

4. The device of claim 1, wherein the channel modulator comprises a switch configured to modify the impedance of the antenna in accordance with the transmit data.

5. The device of claim 1, wherein the channel modulator is further configured to adjust a rate of modulation in accordance with wireless network traffic conditions.

6. The device of claim 5, wherein the channel modulator is configured to adjust the rate of modulation by changing a duration of modulation for a bit of the transmit data.

7. The device of claim 6, further comprising a power harvester configured to power the channel modulator using power harvested from an environment in which the device is located.

8. The device of claim 7, wherein the power harvester is configured to power the channel modulator using power harvested from RF signals received by the antenna.

9. The device of claim 6, wherein the another device comprises an access point device.

10. The device of claim 6, further comprising an energy detector, the energy detector configured to detect a presence or absence of a transmitted packet in a time interval and output a first value corresponding to the presence of the transmitted packet and a second value corresponding to the absence of the transmitted packet.

11. The device of claim 10, wherein the energy detector comprises an envelope detector, a peak finder, a set-threshold circuit and a comparator.

12. A method of wireless networking communication, the method comprising:
   receiving, at an endpoint device, wireless networking communication signals provided by an access point device;
   decoding, at the endpoint device, a query from the access point device, wherein the query is transmitted using a presence or absence of a packet to indicate a bit;
   responding to the query by transmitting data to the access point device, at least in part by modulating a channel associated with the wireless networking communication signals, wherein a first time during which the channel is modulated for each bit of data is greater than a second time required for transmission of a plurality of packets of the wireless networking communication signals.

13. The method of claim 12, wherein the wireless networking communication signals comprise signals.

14. The method of claim 12, wherein the decoding occurs using an energy detector to differentiate between the presence and absence of a packet.

15. The method of claim 12, wherein modulating the channel comprises absorbing or reflecting at least a portion of the wireless networking communication signals.

16. The method of claim 14, wherein using the energy detector comprises:
   detecting the presence or the absence of the packet in a time interval; and
   outputting a first value corresponding to the presence of the packet and a second value corresponding to the absence of the packet.

17. The method of claim 14, wherein the energy detector comprises an envelope detector, a peak finder, a set-threshold circuit and a comparator.

18. The method of claim 12, wherein modulating the channel comprises altering channel measurements for the wireless networking communication signals received by the access point device.

19. The method of claim 12, wherein modulating the channel comprises modifying an impedance of an antenna of the endpoint device in accordance with the data.

20. The method of claim 12, wherein modulating the channel comprises adjusting a rate of modulation by changing a duration of modulation for a bit of the data.

* * * * *